(12) United States Patent
Moore

(10) Patent No.: US 8,180,624 B2
(45) Date of Patent: May 15, 2012

(54) FAST BEAM-SEARCH DECODING FOR PHRASAL STATISTICAL MACHINE TRANSLATION

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/850,210

(22) Filed: Sep. 5, 2007

(65) Prior Publication Data

US 2009/0063130 A1    Mar. 5, 2009

(51) Int. Cl.
    *G06F 17/28*    (2006.01)
(52) U.S. Cl. ................................. 704/4; 704/2; 704/5
(58) Field of Classification Search .................. None
    See application file for complete search history.

(56) References Cited

U.S. PATENT DOCUMENTS

| | | | |
|---|---|---|---|
| 6,182,026 B1 | 1/2001 | Tillmann et al. | |
| 7,200,550 B2 | 4/2007 | Menezes et al. | |
| 7,454,326 B2 * | 11/2008 | Marcu et al. | 704/2 |
| 7,505,894 B2 * | 3/2009 | Menezes et al. | 704/3 |
| 2003/0014254 A1 * | 1/2003 | Zhang et al. | 704/260 |
| 2004/0030551 A1 | 2/2004 | Marcu et al. | |
| 2004/0044530 A1 | 3/2004 | Moore | |
| 2005/0038643 A1 | 2/2005 | Koehn | |
| 2005/0049851 A1 | 3/2005 | Watanabe et al. | |
| 2005/0228640 A1 | 10/2005 | Aue et al. | |
| 2007/0010989 A1 * | 1/2007 | Faruquie et al. | 704/2 |
| 2007/0016400 A1 | 1/2007 | Soricutt et al. | |
| 2007/0016401 A1 * | 1/2007 | Ehsani et al. | 704/9 |
| 2007/0083357 A1 | 4/2007 | Moore et al. | |
| 2007/0150257 A1 | 6/2007 | Cancedda et al. | |

OTHER PUBLICATIONS

Mitamura, T. et al. "Keyword translation accuracy and cross-lingual question answering in chinese and japanese," EACL 2006 Workshop on Multilingual Question Answering.*
Crego, J., Mariño, J., de Gispert, A., 2005. An Ngram-based statistical machine translation decoder. In: Proceedings of the 9th International Conference on Spoken Language Processing, ICSLP'05, Lisboa.*
Deyi Xiong, Qun Liu, Shouxun Lin: Maximum Entropy Based Phrase Reordering Model for Statistical Machine Translation. ACL 2006.*
Sanghun Kim, Youngjik Lee, and Keikichi Hirose, Unit Generation Based on Phrase Break Strength and Pruning for Corpus-Based Text-to-Speech, ETRI Journal, vol. 23, No. 4, Dec. 2001, pp. 168-176.*
C. Tillmann and H. Ney (2003). Word reordering and a dynamic programming beam search algorithm for statistical machine translation. Computational Linguistics, 29:97-133.*
Franz Josef Och. Minimum Error Rate Training in Statistical Machine Translation. In Proceedings of the 41st Annual Meeting of the ACL, Jul. 2003 (pp. 160-167). Sapporo, Japan. http://www.fjoch.com/acl03.pdf. Last accessed Aug. 21, 2007.
Franz Josef Och, et al. Statistical Machine Translation: From Single-Word Models to Alignment Templates http://sylvester.bth.rwth-aachen.de/dissertationen/2003/059/03_059.pdf. Last accessed Aug. 21, 2007.

(Continued)

*Primary Examiner* — Matthew Sked
(74) *Attorney, Agent, or Firm* — Lee & Hayes, PLLC

(57) ABSTRACT

Improved systems, methods and apparatuses are provided for fast beam-search decoding for phrasal statistical machine translation. The provided techniques incorporate a front-loaded distortion penalty estimate for future estimated distortion penalty and/or early pruning to reduce the search space. The improvements result in up to an order of magnitude increase in translation speed for statistical machine translation systems. The disclosed details enable various refinements and modifications according to decoder and system design considerations.

20 Claims, 11 Drawing Sheets

OTHER PUBLICATIONS

P. F. Brown, et al. The Mathematics of Statistical Machine Translation: Parameter Estimation. Computational Linguistics, 19(2):263-311. 1993, Association for Computational Linguistics. Last accessed Oct. 29, 2007.

P. Koehn. Noun Phrase Translation. PhD Dissertation, Computer Science, University of Southern California, Los Angeles, California, USA. Dec. 2003. Last accessed Oct. 29, 2007.

P. Koehn. Pharaoh: a Beam Search Decoder for Phrase-Based Statistical Machine Translation Models, User Manual and Description for Version 1.2. USC Information Sciences Institute. Aug. 18, 2004. http://www.isi.edu/publications/licensedsw/pharaoh/manual-v1.2.ps. Last accessed Oct. 29, 2007.

P. Koehn. Pharaoh: a Beam Search Decoder for Phrase-Based Statistical Machine Translation Models. In Proceedings of AMTA-2004, The 6th Conference of the Association for Machine Translation in the Americas (pp. 115-124). Washington, DC, USA. Last accessed Oct. 29, 20.07.

P. Koehn, et al. Statistical Phrase-Based Translation. In Proceedings of the Human Language Technology Conference of the North American Chapter of the Association for Computational Linguistics (pp. 127-133). Edmonton, Alberta, Canada. Last accessed Oct. 29, 2007.

R. C. Moore, et al. Improved Discriminative Bilingual Word Alignment. In Proceedings of the 21st International Conference on Computational Linguistics and 44th Annual Meeting of the Association for Computational Linguistics (pp. 513-520). Sydney, Australia. Jul. 2006. Last accessed Oct. 29, 2007.

R. Mihalcea, et al. An Evaluation Exercise for Word Alignment. In Proceedings of the HLTNAACL 2003 Workshop, Building and Using Parallel Texts: Data Driven Machine Translation and Beyond (pp. 1-6). Edmonton, Alberta, Canada, May-Jun. 2003. Last accessed Oct. 29, 2007.

K. Papineni, et al. BLEU: a Method for Automatic Evaluation of Machine Translation. In Proceedings of the 40th Annual Meeting of the Association for Computational Linguistics (pp. 311-318), Jul. 2002. Philadelphia, Pennsylvania, USA.

Franz Josef Och, et al. The Alignment Template Approach to Statistical Machine Translation. 2004, Association for Computational Linguistics. http://acl.ldc.upenn.edu/J/J04/J04-4002.pdf. Last accessed Oct. 29, 2007.

* cited by examiner

```
1  initialize hypothesisStack[0 .. nf];
2  create initial hypothesis hyp_init;
3  add to stack hypothesisStack[0];
4  for i=0 to nf-1:
5    for each hyp in hypothesisStack[i]:
6      for each new_hyp that can be derived from hyp:  ───102
7        nf[new_hyp] = number of foreign words covered by new_hyp;
8        add new_hyp to hypothesisStack[nf[new_hyp]];
9        prune hypothesisStack[nf[new_hyp]];
10 find best hypothesis best_hyp in hypothesisStack[nf];
11 output best path that leads to best_hyp;
```

FIG. 1

To process the list of hypotheses covering i source words: ——404

6.1  Compute a score min_score to be used as a minimum score, before adjusting the estimated language model score, for new hypotheses derived from hypotheses covering i source words.
6.2  For each hypothesis current_hyp in the list of hypotheses covering i source words, and its estimated score current_score:
6.3   For each untranslated word position p1, from left to right:
6.4    Compute minimum weighted distortion penalty increment min_dist_inc for extending current_hyp by translating a phrase starting at p1.
6.5    If current_score - min_dist_inc < min_score:
6.6     Terminate the current search through values of p1.
6.7    Otherwise:
6.8     For each untranslated word position p2, from p1 left to right through all consecutive untranslated words:
6.9      Compute the weighted distortion penalty increment dist_inc for extending current_hyp by translating a phrase starting at p1 and ending at p2.
6.10     If current_score - dist_inc < min_score:
6.11      Terminate the current search through values of p2.
6.12     Otherwise:
6.13      For each possible translation target_phrase of the source phrase source_phrase starting at p1 and ending at p2, in order of decreasing translation score:
6.14       Let new_hyp be the new hypothesis derived from current_hyp by adding target_phrase as a translation of source_phrase.
6.15       Initialize the score new_score of new_hpy to be equal to current_score.
6.16       Subtract from new_score the difference in weighted distortion penalty between new_hyp and current_hyp.
6.17       Add to new_score the difference in weighted estimated translation score between new_hyp and current_hyp.
6.18       If new_score < min_score:
6.19        Terminate the current search through possible translations of source_phrase.
6.21       Otherwise:
6.23        Add to new_score the difference in weighted estimated language model score between new_hyp and current_hyp.
6.24        Count the number of source words j covered by new_hyp.
6.25        Add new_hyp along with its estimated score new_score to the list of hypotheses covering j source words.
      Prune the list of hypotheses covering j source words.

FAST BEAM-SEARCH DECODING FOR PHRASAL STATISTICAL MACHINE TRANSLATION

TECHNICAL FIELD

The subject disclosure relates to machine translation, and more particularly to beam-search decoding for phrasal statistical machine translation.

BACKGROUND

Statistical machine translation (SMT) is a machine translation technique where translations are generated on the basis of statistical models. The models' parameters are derived from the analysis of one or more bilingual text corpora, where a text corpus is a large and structured set of texts (e.g., usually electronically stored and processed). The statistical approach contrasts with the rule-based machine translation (RBMT) to machine translation as well as with example-based machine translation (EBMT).

The ideas behind SMT systems come from information theory. Essentially, a document is translated on the probability that a string in a native language (e.g., English) is a translation of a string in a foreign language (e.g., German). Benefits of SMT over other techniques include better use of resources (e.g., a great deal of natural language is in machine-readable format, SMT systems are not limited to any specific pair of languages, and RBMT systems require manual development of linguistic rules, which can be costly and often do not generalize to other languages) and more natural translations.

In word-based SMT, the translated elements are words, where the number of words in translated sentences are different due to compound words, morphology and idioms. Simple word-based translation is not able to translate language pairs with fertility rates different from one without mapping a single word in the foreign language to multiple words in the native language. However, the mapping typically does not work in the reverse translation.

As a result, phrase-based translation systems were developed to overcome this limitation, where translating sequences of words to sequences of words, where the lengths of phrases can differ. The sequences of words are called, for example, blocks or phrases, where the phrases are found using statistical methods from the corpus rather than linguistic phrases, because the use of linguistic phrases has been shown to decrease translation quality.

Statistical machine translation systems are widely advocated as a promising approach to achieving translation quality at least comparable to the best RBMT systems, with greatly reduced effort to adapt to new language pairs and new domains, provided that sufficient parallel training data is available. One such system is the widely-used Pharaoh phrasal SMT decoder (hereinafter Pharaoh or Pharaoh Decoder). However, to date, SMT systems have been much slower than the best RBMT systems. For example, LANGUAGE WEAVER, currently the only commercial provider of SMT systems, claims to translate 5,000 words per minute per CPU, while SYSTRAN, the market leader in commercial RBMT, claims to translate up to 450 words per second (27,000 words per minute) per CPU.

As a result, there is a desire to increase the speed and computational efficiency of SMT algorithms while preserving the advantages of SMT over other techniques (e.g., high translation quality and efficient adaptability to new language pairs).

SUMMARY

In consideration of the above-described deficiencies of the state of the art, the invention provides a fast beam-search decoding techniques for phrasal statistical machine translation systems, methods, and decoding apparatuses.

Advantageously, the provided techniques increase the speed and computational efficiency of SMT while preserving the high translation quality and efficient adaptability to new language pairs provided by SMT systems.

According to various non-limiting embodiments, the invention provides techniques to improve the estimated cost function used by Pharaoh to rank partial hypotheses, by incorporating an estimate of the distortion penalty to be incurred in translating the rest of the sentence.

The invention further provides techniques that use early pruning of possible next-phrase translations to cut down the overall size of the search space. Taken together, techniques enable decoding speed-ups of an order of magnitude or more, with no reduction in the quality of the resulting translations, as measured by Bleu score.

According to further non-limiting embodiments as described in further detail below, various techniques provided by the invention can be applied to general sequence translation problems, depending on the problem context, regardless of whether a phrase-based model exists, and whether or not reordering is required.

Additionally, various modifications are provided, which achieve a wide range of performance and translation-quality trade-offs, according to system design considerations.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The system and methods for beam-search decoding for phrasal statistical machine translation are further described with reference to the accompanying drawings in which:

FIG. 1 illustrates an algorithm of a Pharaoh implementation suitable for improvements according to various aspects of the invention;

FIG. 4 illustrates an exemplary pseudo code representation of applicable portions of the FIG. 2 Pharaoh implementation using the improved early pruning technique according various non-limiting embodiments of the invention;

DETAILED DESCRIPTION

Figure 2:
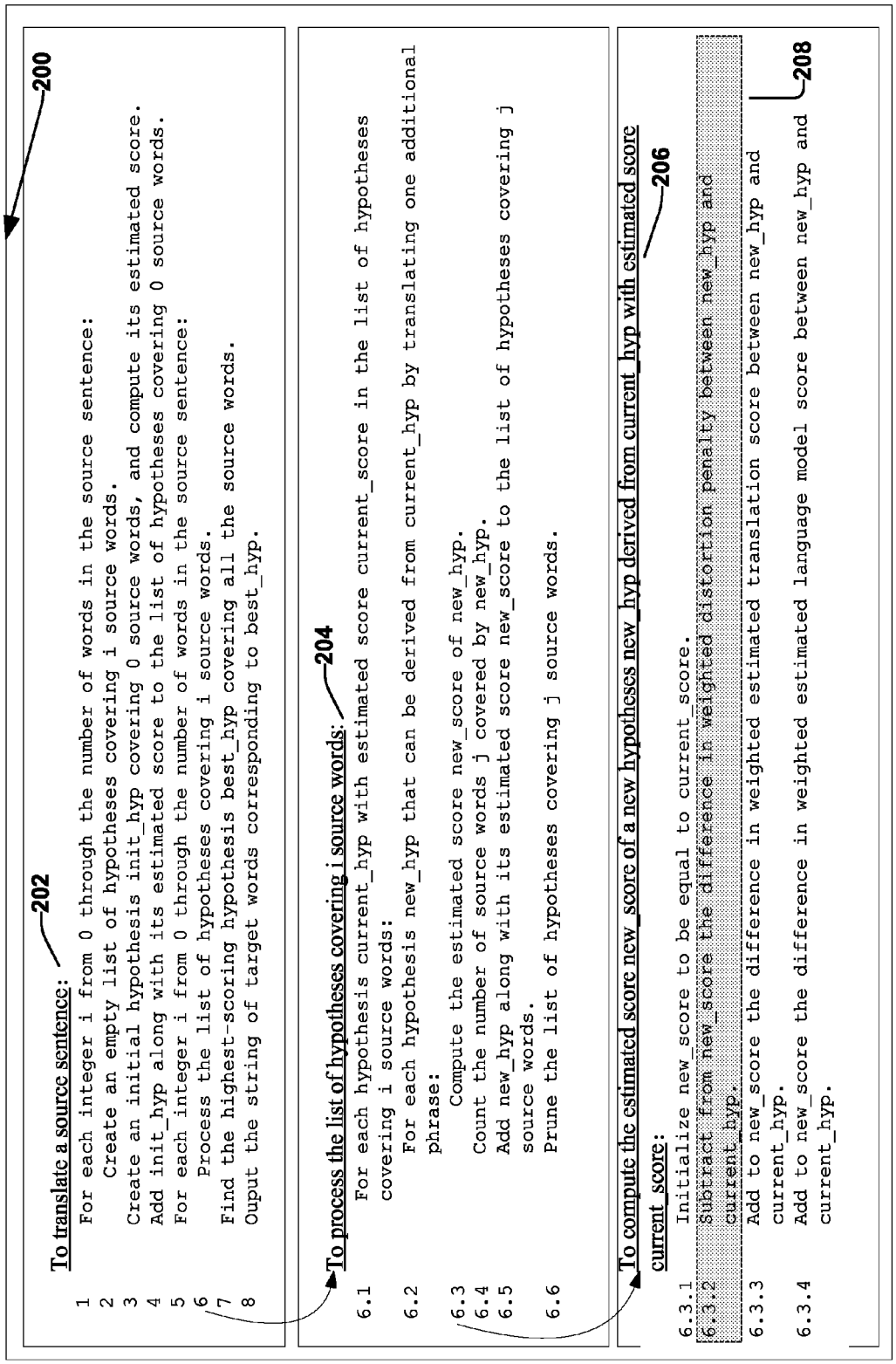
FIG. 2 illustrates an exemplary non-limiting pseudo code representation of applicable portions of a Pharaoh algorithm implementation for phrasal statistical machine translation decoding suitable for improvements according to various aspects of the invention.

Fast Beam-Search Decoding for Phrasal Statistical Machine Translation Overview

As discussed in the background, there exists a desire to increase the speed and computational efficiency of SMT algorithms while preserving the advantages of SMT. According to various non-limiting embodiments of the invention, the Pharaoh decoder can be improved with the techniques provided herein. The techniques provided by the subject invention permit much faster decoding without losing translation quality as measured by the Bleu metric.

According to various embodiments of the invention, one technique improves the estimated cost function used by Pharaoh to rank partial hypotheses, by incorporating an estimate of the distortion penalty yet to be incurred in translating the rest of the sentence. A second technique uses early pruning of possible next-phrase translations to cut down the overall size of the search space. Taken together, techniques enable decoding speed-ups of an order of magnitude or more, with no reduction in the Bleu score of the resulting translations.

Although the description of the techniques herein is described primarily with respect to Pharaoh SMT for language translation problems, it is to be appreciated that one or more of the techniques can be applied in other circumstances for other problems, and the application of such techniques in connection with such problems is intended to fall within the scope of the hereto appended claims. Such problems can generally include any problem that can be viewed as a sequence translation problem.

More specifically, the provided distortion penalty estimation techniques would be particularly useful in situations where the sequence translation problem is not monotone (e.g., where there is some notion that reordering could occur). However, the provided early pruning techniques would be useful even in cases where there is no re-ordering involved. As a result, the application of such techniques in connection in the aforementioned context (e.g., sequence translation problems, with or without reordering, and whether or not a phrase-based model exists) is intended to fall within the scope of the hereto appended claims.

For example, some cases of the general sequence translation problem include language translation, spelling correction (e.g., where it is desired to translate a sequence that has misspelled words in it to a sequence that has correctly spelled words in it), text to speech (e.g., where an orthographic sequence is translated to a phoneme sequence), some cases of grammar correction (e.g., where a sequence having incorrect grammar is translated to a sequence having correct grammar), or any other sequence translation problem whether an analogue of a phrase-based model exists or otherwise.

Phrasal SMT Model

Phrasal SMT translates a source sentence into a target sentence by decomposing the source sentence into a sequence of source phrases, which can be any contiguous sequences of words (or tokens treated as words) in the source sentence. For each source phrase, a target phrase translation is selected, and the target phrases are arranged in some order to produce the complete translation. A set of possible translation candidates created in this way is scored according to a weighted linear combination of feature values, and the highest scoring translation candidate is selected as the translation of the source sentence. Symbolically, $$\hat{t} = \underset{t,a}{\mathrm{argmax}} \sum_{i=1}^{n} \lambda_i f_i(s, a, t) \qquad \text{Eqn. 1}$$

where s is the input sentence, t is a possible output sentence, and a is a phrasal alignment that specifies how t is constructed from s, and $\hat{t}$ is the selected output sentence. The weights $\lambda_i$ associated with each feature $f_i$ are tuned to maximize the quality of the translation hypothesis selected by the decoding procedure that computes the argmax.

According to various non-limiting embodiments, the invention can use a phrasal SMT model that includes the following features: the sum of the log probabilities of each source phrase in the hypothesis given the corresponding target phrase; the sum of the log probabilities of each target phrase in the hypothesis given the corresponding source phrase; the sum of lexical scores for each source phrase given the corresponding target phrase; the sum of lexical scores for each target phrase given the corresponding source phrase; the log of the target language model probability for the sequence of target phrases in the hypothesis; the total number of words in the target phrases in the hypothesis; the total number of source/target phrase pairs composing the hypothesis; a distortion penalty reflecting the degree of divergence of the order of the target phrases from the order of the source phrases. It should be noted that prior implementations describe the translation model and the operation of Pharaoh in terms of products of probabilities rather than sums of log probabilities. However, the choice of sums of log probabilities is completely equivalent, since the product of a set of probabilities is monotonically related to the corresponding sum of log probabilities.

Additionally, according to various non-limiting embodiments, the values of the aforementioned features and their corresponding weights are estimated as follows: The probabilities of source phrases given target phrases and target phrases given source phrases are estimated from a word-aligned bilingual corpus. Furthermore, the phrasal SMT model uses lexical scores computed as the log of the unnormalized probability of the Viterbi alignment for a phrase pair under IBM word-translation Model 1. In addition, for each phrase pair extracted from the word-aligned corpus, the values of these four features are stored in a "phrase table". The target language model is a trigram model smoothed with bigram and unigram language models, estimated from the target language half of the bilingual training corpus. The distortion penalty is computed as required by the Pharaoh decoder, which is further explained with reference to the present invention below. In addition, the feature weights are trained for the overall translation model to maximize the Bleu metric using a minimum-error-rate training procedure.

Overview of Pharaoh Decoder

The following discussion provides additional background information regarding a Pharaoh phrasal SMT decoder implementation to facilitate understanding the techniques described herein.

Referring to FIG. 1, the core algorithm of a Pharaoh decoder is presented, wherein the algorithm uses a beam search to try to find the translation of an input source sentence that has the highest score according to the phrasal SMT model. To that end, the decoder creates a set of possible translations, building each target language string from left to right. At each step, it extends a partial translation hypothesis by picking a source phrase covering words that have not yet been translated in that partial hypothesis, and a possible target language translation for that phrase, and appending the target language phrase to the incomplete target language string. The search through the partial hypotheses proceeds in order of the number of source words translated. All the partial hypotheses that cover the same number of source words are compared to each other, and this set is pruned before any members of the set are extended.

There are at least two key features of Pharaoh that are not revealed at the level of detail presented in FIG. 1. First, in addition to beam-search pruning, Pharaoh also performs lossless pruning whenever multiple partial hypotheses agree in the source words already translated, the last two target words produced, and the position of the final word of last source phrase translated. In this situation, any given hypothesis completion will incur the same incremental cost starting from any of these hypotheses. As a result, the best scoring member of a set of such hypotheses cannot be surpassed by any other in the set. Pharaoh keeps only the highest scoring such hypothesis in the beam search, although the others are saved in case multiple translation hypotheses are desired.

The second key feature of Pharaoh not revealed in FIG. 1 is how Pharaoh computes the partial hypothesis scores used for pruning. The score that Pharaoh uses to compare competing hypotheses consists of two components, an exact score for the part of the translation that the hypothesis is committed to, and an estimated score for the portion of the source sentence remaining to be translated. To compute the estimated scores, before starting to translate a sentence Pharaoh finds the best possible estimated phrase pair score for each source phrase in the phrase table that matches some contiguous subsequence of the input source sentence. An estimated score for every contiguous subsequence of the input is then computed by finding the sequence of source phrases covering the input subsequence with the highest sum of estimated scores. This is computed in $O(n^2)$ time by dynamic programming.

The estimated score for each phrase pair is computed as the sum of the feature values in the phrase table for that phrase pair, along with the target word count and phrase pair count, plus an approximate target language score for the target phrase in the pair, all weighted by the corresponding translation model weights. The target language model score can only be approximated, because it is not yet known what the language model context will be if the phrase pair in question is actually used to complete the translation of the input source sentence. The approximate target language model score therefore uses the unigram probability estimate for the first word of the target phrase, the bigram probability estimate for the second word of the target phrase, and the full trigram probability estimate only for the third and subsequent words of the target phrase.

Phrasal SMT with Distortion Penalty Estimation

FIG. 2 illustrates a pseudo code representation of applicable portions of an implementation of the Pharaoh algorithm for phrasal statistical machine translation decoding 200 for the purposes of demonstrating improvements provided by various non-limiting embodiments of the present invention and as further described with reference to FIGS. 3-4. It should be appreciated that such examples are just a few applications of the provided techniques, and as a result, such examples are not intended to limit the scope of the hereto appended claims.

According to various non-limiting embodiments of the invention, the above general description of a Pharaoh decoder can be improved by incorporating an estimate of the distortion penalty yet to be incurred into the estimated score for the portion of the source sentence remaining to be translated. Notably, such an estimate is absent from the score used by Pharaoh for pruning sets of competing partial hypotheses. For example, the value of the distortion penalty feature used by Pharaoh is the sum of the distances between source phrases whose target phrase translations are adjacent in the target language string. Specifically, an implementation of Pharaoh defines the incremental distortion penalty for each pair of adjacent target phrases as:

$$d = \text{abs}\left( \begin{array}{c} \text{last word position of} \\ \text{previously translated phrase} + 1 - \\ \text{first word position of} \\ \text{newly translated phrase} \end{array} \right) \quad \text{Eqn. 2}$$

Using the following definitions, Eqn. 2 can be broken down into two simple cases:

$\Delta d$ is the distortion penalty increment for a partial hypothesis, relative to the immediate predecessor it was formed from by adding a translation for the source phrase S;

S' is the last source phrase translated in the immediate predecessor;

L(S) and L(S') are the length in words of S and S', respectively; and

D(S,S') is the number of words between S and S'.

In terms of these definitions, the two cases are:

If S is to the right of S', $\Delta d = D(S,S')$      Eqn. 3

If S is to the left of S', $\Delta d = D(S,S') + L(S) + L(S')$      Eqn. 4

According to various non-limiting embodiments of the invention, an estimated distortion penalty yet to be incurred by a partial hypothesis can be defined to be the minimum possible additional distortion penalty, given the source words translated so far and the final word position of the last source phrase translated. It follows by mathematical induction on the number of untranslated words, for any partial hypothesis, the minimum additional distortion penalty is that produced by picking as the next source phrase to translate one that begins with the left-most untranslated source word and proceeding left-to-right covering all the remaining untranslated source words in order. This requires assuming that a distortion penalty increment is incurred if the last source phrase translated does not occur at the end the source sentence.

The computationally simplest way to take this minimum possible additional distortion penalty into account is just to fold it into the distortion penalty as we incrementally accumulate it (e.g., at 208 of FIG. 2). This modification can be described using the previous definitions, and also defining S" to be the longest fully-translated initial segment of the source sentence prior to translating S, and D(S,S") to be the number of words between S and S″. Note that S″ immediately precedes the left-most untranslated word. The computation of the modified $\Delta d$ can be broken down four cases as follows:

If S is adjacent to S″, $\Delta d=0$      Eqn. 5

Otherwise, if $S$ is to the left of $S'$, $\Delta d=2L(S)$      Eqn. 6

Otherwise, if $S'$ is a subsequence of $S''$, $\Delta d=2(D(S,S'')+L(S))$      Eqn. 7

Otherwise, $\Delta d=2(D(S,S')+L(S))$      Eqn. 8

Figure 3:
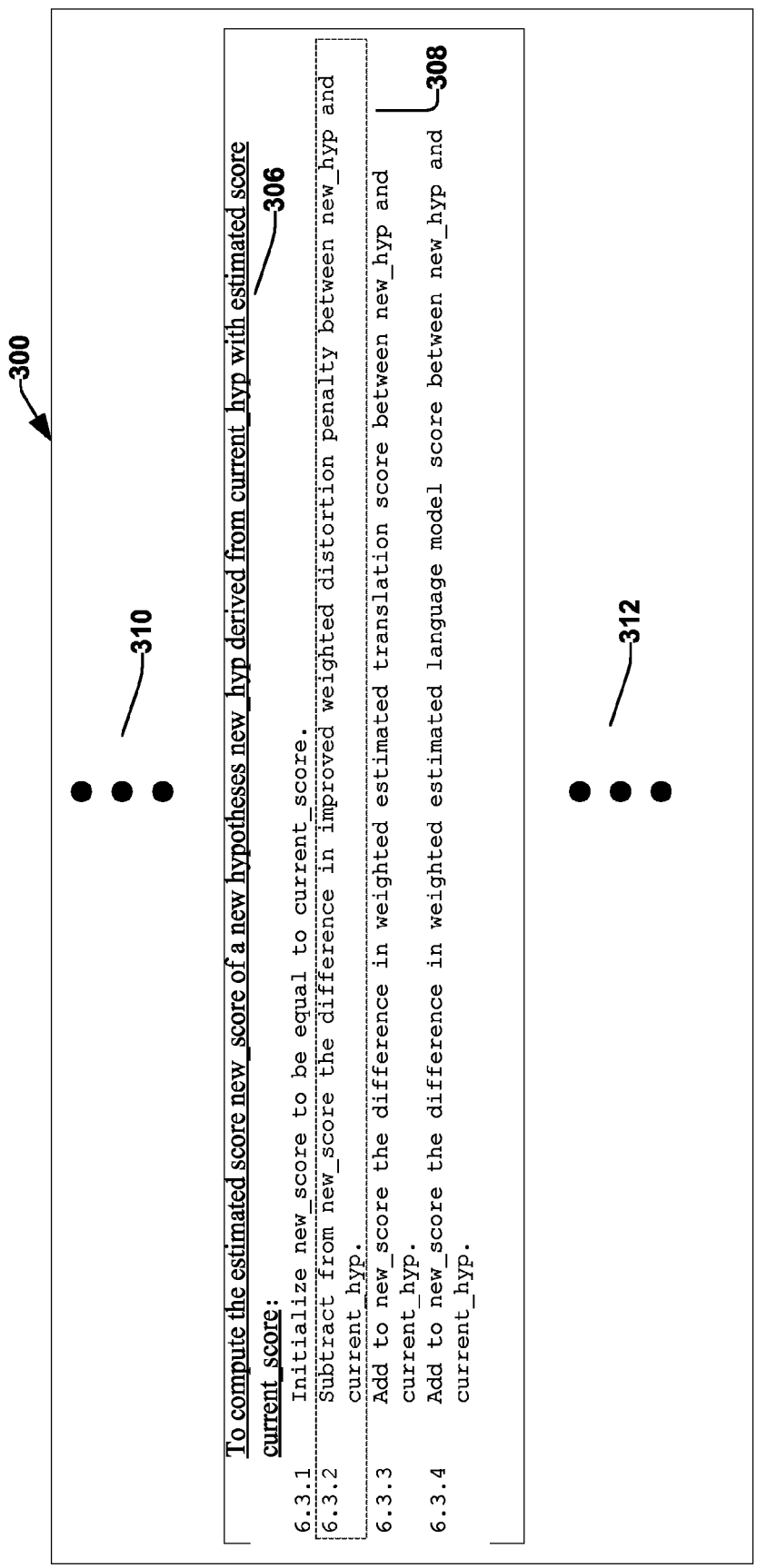
FIG. 3 illustrates an exemplary pseudo code representation of applicable portions of the FIG. 2 Pharaoh implementation using the improved distortion penalty estimate according various non-limiting embodiments of the invention.

FIG. 3 illustrates a pseudo code representation of applicable portions 206 of the FIG. 2 Pharaoh implementation 200 using the improved distortion penalty estimate according various non-limiting embodiments of the invention. This modified distortion penalty estimate advantageously takes into account the distortion penalty yet to be incurred into the estimated score for the portion of the source sentence remaining to be translated by front-loading the accumulation of the distortion penalty. Accordingly, rather than estimating the distortion penalty given in Eqn. 2-4, various embodiments of the present invention can use the improved algorithm described with reference to Eqns. 5-8. Referring back to FIGS. 2 and 3, the new step 308 is substantially similar to step 208. However, by front-loading the anticipated distortion penalty, the improved method allows for improved performance. Ellipses 310 and 312 are used to indicate the flexibility of implementing the improved algorithm into existing implementations.

It follows that the modified distortion penalty can be shown to have the same value as that used in Pharaoh over an entire, completed translation hypothesis. For example, if a single word towards the beginning of a source sentence is skipped over and then a number of phrases is translated monotonically, the distortion penalty as calculated by Pharaoh will be 1, until the decoder jumps back to translate the skipped word. Using the modified distortion penalty of the present invention, as more and more words are translated beyond the skipped word, a progressively larger distortion penalty is accumulated, because the skipped word must eventually be translated by jumping back in the source sentence to translate the skipped word. The invention advantageously takes account of such knowledge on the front end to prune sets of competing partial hypotheses and improve the translation speed. Note that this requires making the same assumption, as noted earlier, that a distortion penalty increment is incurred if the last source phrase translated does not occur at the end the source sentence.

Early Pruning

FIG. 4 illustrates a pseudo code representation of applicable portions 204, 206 of the FIG. 2 Pharaoh implementation 200 using the improved early pruning technique according various non-limiting embodiments of the invention. This technique advantageously allows elimination of multiple possible next source phrases and multiple possible translations for source phrases not eliminated, without even examining them, by taking advantage of heretofore non-intuitive properties of SMT algorithms. Accordingly, elements 204 and 206 of Pharaoh implementation 200 can be replaced by new element 404, according to various embodiments of the invention. Notably, depending on the problem context, early pruning can advantageously be used with existing algorithms and with or without the improved distortion penalty estimate. This is illustrated in FIG. 4 at 408. While not shown in FIG. 4, it is to be understood that the pseudo code representation can be integrated into existing algorithm implementations as is described in further detail below.

Accordingly, various non-limiting embodiments of the invention can further improve the Pharaoh decoder by pruning the search earlier than Pharaoh does. This is accomplished in a way that enables elimination of multiple possible next source phrases and multiple possible translations for source phrases not eliminated, without even examining them, provided that it is acceptable to forgo having the pruning take into account the language model score adjustment (FIG. 2 and FIG. 3, line 6.3.4) for the last phrase translated in a given partial hypothesis.

The early pruning modification of the Pharaoh algorithm addresses the sixth line, 102 in FIG. 1 "for each new_hyp that can be derived from hyp:" or element 204 of FIG. 2. A consequence of this line in conventional Pharaoh implementations is that, subject to static phrase table and distortion limits discussed below, every possible translation of every possible next phrase (not involving words already translated) will be considered as an extension to a given partial hypothesis. As a result, no pruning of any possible extension is considered until an estimated score for the extension has been computed as described with reference to FIG. 1, or 206 in FIG. 2, or 306 in FIG. 3.

Recall that in order to have an estimated score for each possible subsequence of the input source ready, an estimated score for each possible phrase translation that includes all aspects of the translation model is precomputed, except for the distortion penalty and a language model score adjustment that replaces the unigram and bigram scores for the first two words of the target phrase with their full trigram scores.

Taking advantage of this observation, according to various non-limiting embodiments of the invention, the search can be pruned earlier than Pharaoh does, in a way that can advantageously eliminate multiple possible next source phrases and multiple possible translations for source phrases not eliminated, without even examining them. As described above, this requires forgoing the language model score adjustment for the last phrase translated in a given partial hypothesis for pruning.

According to various embodiments, additional points at which the search is pruned can be introduced into the algorithm by comparing the scores for possible extensions of partial hypotheses covering n source words to the highest score for any partial hypothesis covering n source words. The search for extensions of a given partial hypothesis covering n source words can be stopped when the estimated scores of its extensions (before making the language model score adjustment) become worse, by more than a fixed threshold, than the highest score for any partial hypothesis covering n words. Furthermore, this pruning step can advantageously be performed in addition to performing Pharaoh's pruning step, which compares all partial hypotheses covering n source words to each other using an estimated score that does include the language model score adjustment.

Several observations are helpful in organizing the search through possible extensions to a given partial hypothesis. First, for any given starting point for the next phrase to be translated, a phrase of length 1 will produce the minimum additional distortion penalty. Second, the minimum additional distortion penalty given a starting point never decreases as we move the starting point from left to right. Third, for any given starting point, the additional distortion penalty never decreases as we increase the length of the source phrase to be translated.

Based on these observations, for each set of partial hypotheses covering the same number of source words, a minimum acceptable score for extensions of these hypotheses can be established, equal to the highest score for any hypothesis in the set minus our early pruning threshold according to various embodiments of the invention. Then the search can be performed from left to right through the possible starting positions for the next source phrase to translate. For each position, the minimum additional distortion penalty for a source phrase starting at that position can be determined. If a possible starting position is found such that the minimum additional distortion penalty (weighted by the corresponding translation model weight) results in a score worse than the current minimum acceptable score, the search for possible next source phrases to translate can be stopped, because all possible starting position that have not been considered will also have scores worse than the current minimum acceptable score.

For each possible starting position that passes this test, the search can proceed through possible ending positions from left to right. If a possible ending position is found such that the weighted additional distortion penalty for the phrase spanning the starting and ending positions results in a score worse than the current minimum acceptable score, the search for possible ending positions for that starting position can be stopped, because all the possible ending positions that have not been considered will also have weighted additional distortion penalties that result in scores worse than the current minimum acceptable score.

Accordingly, each starting and ending position pair that passes this test defines a possible next source phrase to translate. For each such source phrase that has entries in the phrase table, its possible translations can be searched through, for example, from highest scoring to lowest scoring. For each translation considered, the estimated score of the resulting partial hypothesis can be computed, taking into account everything except the language model score adjustment. If this estimated score is worse than the current minimum acceptable score, the search for possible translations for this source phrase can be stopped, because all the translations that have not been considered will also yield estimated scores worse than the current minimum acceptable score.

Figure 5:
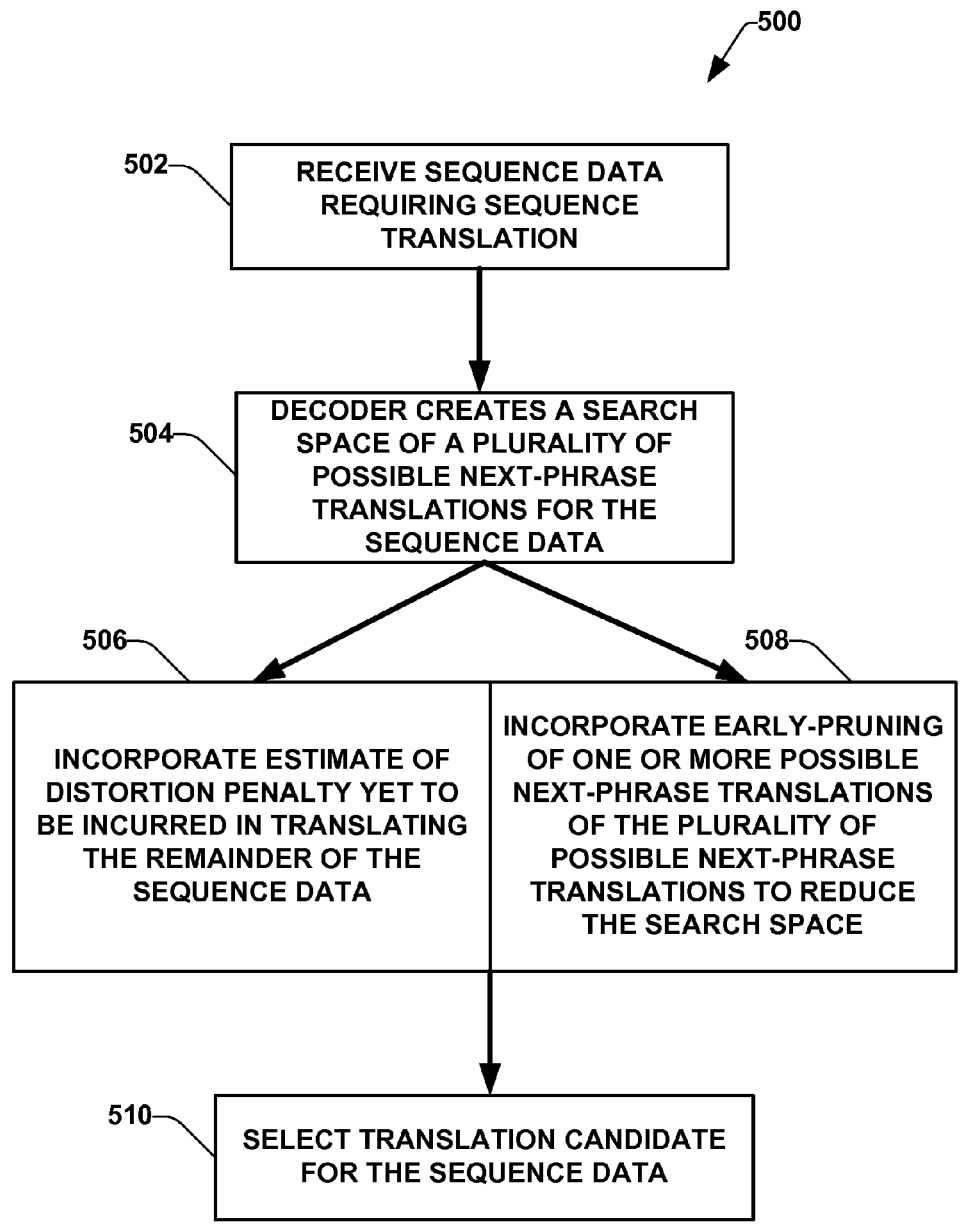
FIG. 5 illustrates a particular non-limiting high level methodology according to various aspects of the present invention.

FIG. 5 illustrates one high level methodology according to various aspects of the present invention. The methodology receives sequence data requiring sequence translation at 502. As described above, the invention contemplates that the provided techniques may be used on any data requiring sequence translation depending on the problem context, regardless of whether reordering is required, and whether or not a phrase-based model exists. At 504, the method uses a decoder to create a search space of a plurality of possible next-phrase translations for the sequence data. Next, at 506 and 508, either one or both of an estimate of a distortion penalty yet to be incurred in translating the remainder of the sequence data, or early-pruning of one or more possible next-phrase translations of the plurality of possible next-phrase translations to reduce the search space, is incorporated into the decoder according to the problem context, system design considerations, and performance-complexity considerations. Invariably, at 510 a substantially high scoring translation candidate (e.g., highest scoring) is selected as the translation for the sequence data. While for purposes of explanation, the methodology is shown as a series of blocks, it is to be appreciated that the claimed subject matter is not limited by the order of the blocks, as some blocks may occur in different orders and/or concurrently with other blocks from what is depicted. Where non-sequential, or branched, flow is illustrated it is to be appreciated that various other branches, flow paths, and orders of the blocks, may be implemented which achieve the same or a similar result. Moreover, not all illustrated blocks may be required to implement the methodology described hereinafter.

Figure 6:
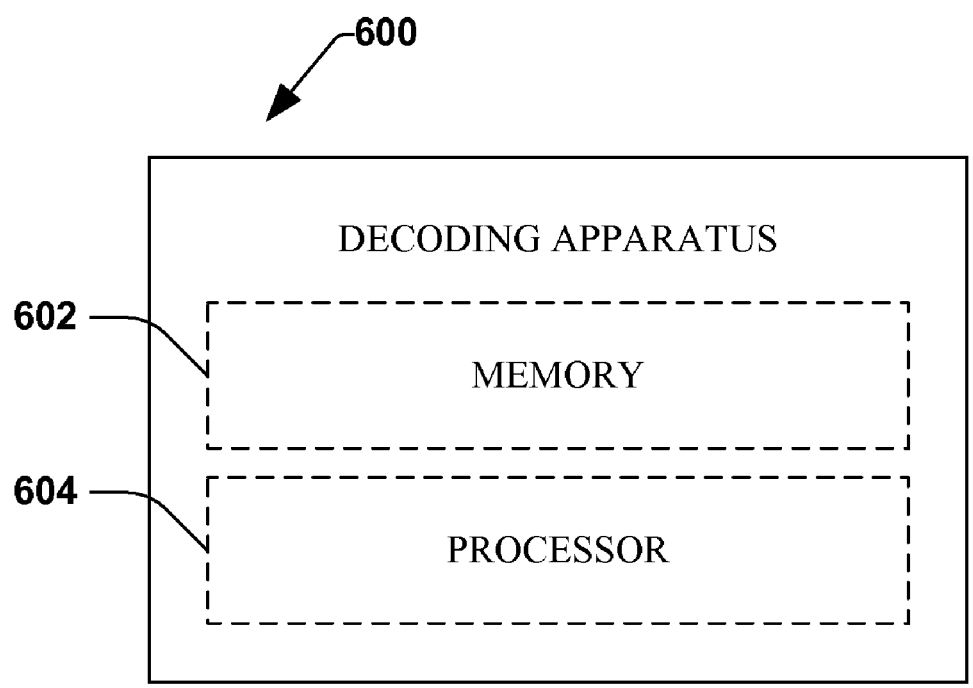
FIG. 6 illustrates an exemplary non-limiting decoding apparatus suitable for performing various techniques of the present invention.

FIG. 6 illustrates an exemplary non-limiting decoding apparatus suitable for performing various techniques of the present invention. The apparatus 600 can be a stand-alone decoding apparatus or portion thereof or a specially programmed computing device or a portion thereof (e.g., a memory retaining instructions for performing the techniques as described herein coupled to a processor). Apparatus 600 can include a memory 602 that retains various instructions with respect to sequence translation, statistical calculations, analytical routines, and/or the like. For instance, apparatus 600 can include a memory 602 that retains instructions for performing various calculations and logical determinations regarding the particular context of the sequence translation problem. Thus, for example, memory 602 can include instructions for early pruning possible next-phrase translations to cut down the overall size of the search space for a beam-search phrasal SMT decoding context. In the same context, memory 602 can further include instructions for incorporating an estimate of the distortion penalty yet to be incurred in translating the rest of a sentence. The above example instructions and other suitable instructions can be retained within memory 602, and a processor 604 can be utilized in connection with executing the instructions.

Figure 7:
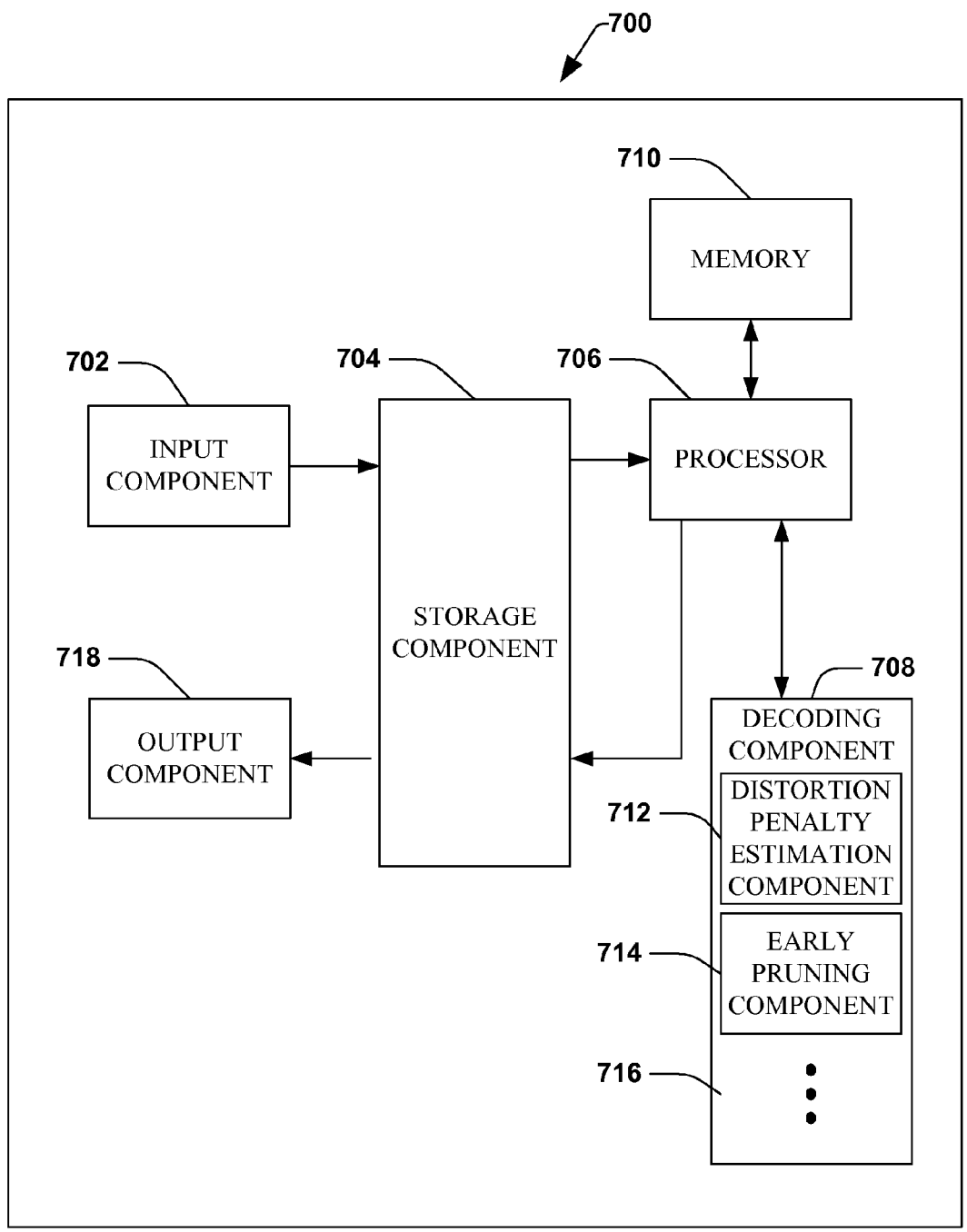
FIG. 7 illustrates an exemplary non-limiting system suitable for performing various techniques of the present invention.

FIG. 7 illustrates a system 700 that can be utilized in connection with the improved SMT techniques as described herein. System 700 comprises an input component 702 that receives data for sequence translation, and performs typical actions thereon (e.g., transmits to storage component 704) the received data. A storage component 704 can store the received data for later processing or can provide to data to a processor 706 via memory 710 over a suitable communications bus.

Processor 706 can be a processor dedicated to analyzing information received by input component 702 and/or generating information for transmission by an output component 718. Processor 706 can be a processor that controls one or more portions of system 700, and/or a processor that analyzes information received by receiver 702, generates information for transmission by output component 718, and performs various decoding algorithms of decoding component 708. System 700 can include a decoding component 708 that can perform the various techniques 712, 714 as described herein, in addition to the various other functions required by the sequence translation problem context 716. While decoding component 708 is shown external to the processor 706 and memory 710, it is to be appreciated that decoding component 708 can include decoding code stored in storage component 704 and subsequently retained in memory 710 for execution by processor 706. The decoding code can utilize artificial intelligence based methods in connection with performing inference and/or probabilistic determinations and/or statistical-based determinations in connection with sequence translation problems.

System 700 can additionally comprise memory 710 that is operatively coupled to processor 706 and that stores information such as described above, parameters, information, translation tables, and the like, wherein such information can be employed in connection with implementing the improved SMT techniques as described herein. Memory 710 can additionally store protocols associated with generating lookup tables, etc., such that system 700 can employ stored protocols and/or algorithms further to the performance of sequence translation. It will be appreciated that either storage component 704 or memory 706 or both described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 710 is intended to comprise, without being limited to, these and any other suitable types of memory. In addition, by way of illustration and not limitation, storage component 704 can include conventional storage media as in known in the art (e.g., hard disk drive).

Evaluation

The following provides a description of the invention with respect to particular implementations and wherein certain details and parameters are provided for illustration. It is to be appreciated that the provided embodiments are exemplary and non-limiting implementations of the techniques provided by the present invention. As a result, such examples are not intended to limit the scope of the hereto appended claims. For example, certain parameters or combinations thereof are listed for illustration only and are not intended to imply that other parameters or combinations thereof are not possible or desirable. Similarly, while the following describes the implementations in a byte-code interpreted language (e.g., Perl) for evaluation purposes, it should be apparent to one skilled in the art that the algorithm can be implemented in any suitable programming language. Accordingly, such modifications as would be apparent to one skilled in the are intended to fall within the scope of the hereto appended claims.

The above-described modifications to the Pharaoh decoding algorithm have been shown to result in decoding speed-ups of more than an order of magnitude. The decoding speed of 3.59 milliseconds per word produced by accepting a score lower than the best obtainable by just 0.02 Bleu[%] is equivalent to translating more than 16,700 words per minute. While the described modifications were implemented in Perl, there seems little doubt that the improvements provided by the subject invention could easily obtain translation speeds comparable to those of commercial RBMT systems, simply by coding the algorithm in a language that compiles to native machine code.

Experiments were conducted evaluating three different algorithms: the original Pharaoh algorithm, the Pharaoh algorithm plus distortion penalty estimation, and the Pharaoh algorithm plus distortion penalty estimation and early pruning. It is noted that without distortion penalty estimation, early pruning can lead to failure to find a translation, because it is possible for all extensions of all partial hypotheses covering some particular number of source words to fail the early pruning test. Advantageously, the distortion penalty estimate as provided by the present invention avoids such a case, because the highest scoring partial hypothesis covering a given number of source words will have at least one extension with the same estimated score (before making the language model score adjustment), which therefore passes the early pruning test.

In order to measure as accurately as possible the effects of modifying the Pharaoh algorithm according to various aspects of the present invention, the Pharaoh algorithm has been implemented in such a way that the three systems are identical except for the algorithmic differences under evaluation. As mentioned, all three algorithms have been implemented in Perl, which is a byte-code interpreted language, so the absolute time measurements are slower that what would be expected from implementations that compile to native machine code. However, the relative timings should still be indicative of the relative efficiency of the algorithms and the benefits provided by the subject invention. Moreover, a measure of the search space explored is shown that should be independent of other implementation details (e.g., the number of partial hypotheses evaluated per source word).

Because decoding effort depends on several pruning parameters, a fair evaluation of the Pharaoh algorithm and its variants requires testing many combinations of settings for these parameters. There are four main pruning parameters:

T-table threshold: the maximum difference in estimated score between the best translation and the worst translation in the phrase table for a given source phrase;

Beam threshold: the maximum difference in estimated score between the best partial hypothesis and the worst partial hypothesis retained for a given number of source words covered;

T-table limit: the maximum number of translations in the phrase table for a given source phrase; and Beam limit: the maximum number of partial hypotheses retained for a given number of source words covered.

Where discussed below, particular vectors of pruning parameter settings are given in the order above. A fifth parameter that can be viewed as a pruning parameter is the distortion limit, which can restrict the maximum distortion increment permitted between source phrases whose translations are adjacent in the output target sentence. However, this can also be viewed as a model parameter, because setting it to an optimum value usually improves translation quality over leaving it unrestricted. For all the experiments reported herein, the distortion limit is set to 5, which seems to be within the range of typical settings for using Pharaoh. It is also noted that it appeared in informal experimentation that for settings greater than 5, translation quality started to decline markedly given our data and models.

According to particular non-limiting embodiments, the version of distortion limit implemented herein allows one more word in the backward direction than in the forward direction. Otherwise a distortion limit of 1 would allow no distortion at all, since the minimum cost of a backwards jump is 2, as follows from the description above. In addition, configurations where jumping back to the left-most untranslated word would violate the distortion limit were disallowed. For all three algorithms tested, the conventional definition of distortion was used for applying the distortion limit, even when the modified version was used in the beam search.

For the decoder with early pruning, the early pruning threshold might also be treated as an independent parameter. However, there is a close connection between the early pruning threshold and the T-table threshold. For example, if the T-table threshold is increased beyond the early pruning threshold, none of the additional phrase table entries will ever survive early pruning. Therefore, according to particular non-limiting embodiments, the same setting for the T-table and early pruning thresholds were used.

In addition, a hill-climbing search for combinations of settings of the four pruning parameters that produce good trade-offs of decoding time vs. Bleu score was performed. For example, five different settings for each of the pruning parameters were explored (e.g., 0.5, 1.0, 1.5, 2.0, and 2.5 for the threshold parameters, and 5, 10, 15, 20, and 25 for the limit parameters). For the modified algorithms, this appeared to be a sufficient range to find the operating points that produced the highest Bleu score. However, because the baseline Pharaoh algorithm seemed to require a greater beam limit to avoid losing translation quality, beam limits of 30, 35, 40, 45, 50, 60, 75, and 100 were tested with the baseline system, with the other parameters set to selected combinations of settings that produced acceptable time-quality tradeoffs at lower beam limits.

The training and test data was a standard English-French bilingual corpus of Canadian Hansards parliamentary proceedings, for which automatic sentence alignment was conducted. For training both the phrase translation models and IBM Model 1 lexical scores, 500,000 sentences pairs from this corpus were used. Additionally, the training data was word-aligned using a state-of-the-art word-alignment method, and all pairs of phrases up to 7 words in length were extracted and their translation probabilities estimated using conventional methods. A separate set of 500 sentence pairs was used to train the translation model weights, and an additional 2000 sentence pairs were used for test data.

Figure 8:
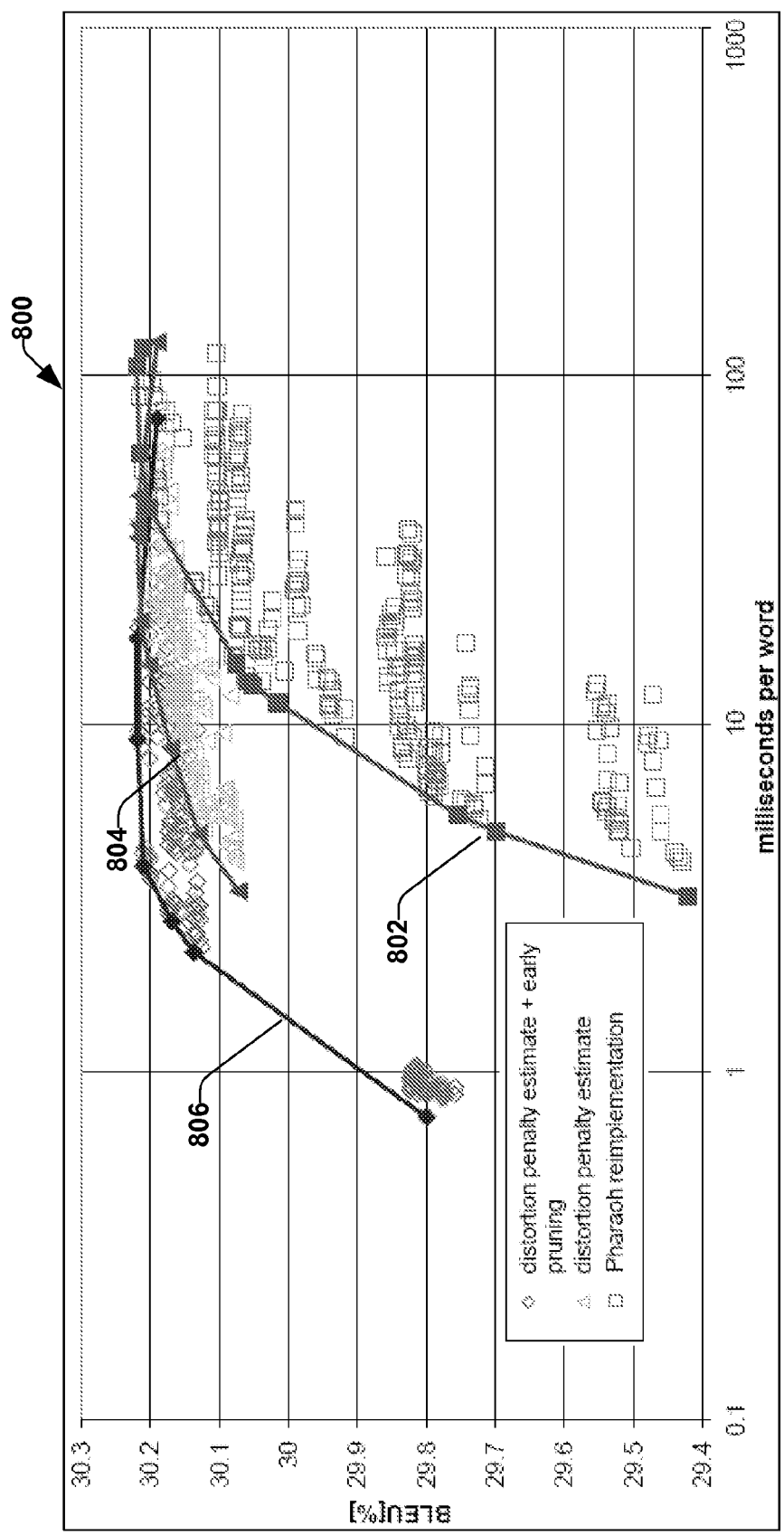
FIG. 8 depicts the translation performance of particular non-limiting embodiments of a fast beam-search phrasal SMT decoder.
Figure 9:
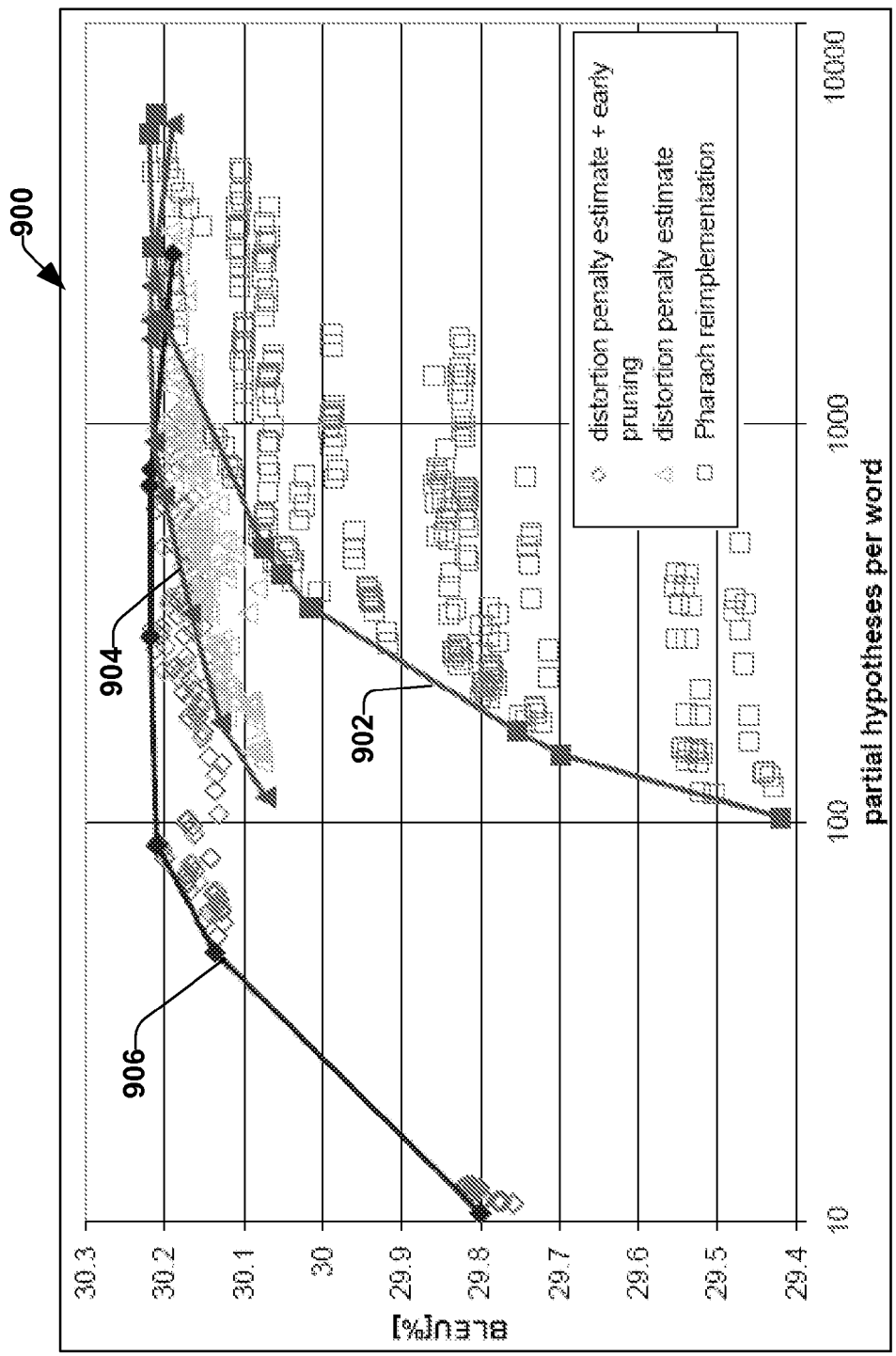
FIG. 9 depicts the translation performance of particular non-limiting embodiments of a fast beam-search phrasal SMT decoder.

FIGS. 8-9 depict the translation performance of particular non-limiting embodiments of a fast beam-search phrasal SMT decoder. For each combination of pruning parameter settings tested, the time required for decoding in milliseconds per word, the size of the search space in partial hypotheses evaluated per word, and the Bleu score of the resulting translations on a scale of 0-100 (e.g., Bleu[%]) were measured and plotted for each of the original Pharaoh algorithm 802, 902, the Pharaoh algorithm plus distortion penalty estimation 804, 904, and the Pharaoh algorithm plus distortion penalty estimation and early pruning 806, 906. Note that the horizontal axes are presented logarithmically to make the differences in decoding effort clear at all scales. In addition, because the scatter plots for the three algorithms overlap somewhat, the limits of each algorithm have been highlighted as defined by the upper convex hull of points for that algorithm (depicted as solid bold lines for the respective results). This indicates what are arguably the best points in terms of the trade off between decoding effort and translation quality as measured by the metrics.

From FIGS. 8 and 9, it is clear that all three algorithms eventually produce the same highest value for the Bleu score (30.22 Bleu[%]), but the algorithm that employs distortion penalty estimation advantageously does so with much less decoding effort than the baseline algorithm. Furthermore, the algorithm that uses both distortion penalty estimation and early pruning requires even less decoding effort. This is true whether decoding effort is measured in terms of time or search space. Indeed, for each of the three algorithms, the correlation between the decoding time and the number of partial hypotheses evaluated is greater than 0.99. In a particular non-limiting embodiment, the pruning parameter vectors that produced the highest Bleu score were (1.5,1.0,20,10) for both of the modified algorithms, and (1.5,1.0,20,75) for the Pharaoh baseline algorithm.

Comparing the decoding times needed to obtain the highest Bleu score, the Pharaoh algorithm 802 takes 106.0 milliseconds per word, adding distortion penalty estimation 804 reduced this to 34.2 milliseconds per word, and adding early pruning 806 reduced the time to 9.02 milliseconds per word. As one possible decoding design trade-off, accepting a Bleu score 0.02 Bleu[%] lower (30.20) (e.g., lower translation quality), the Pharaoh algorithm 802 takes 38.6 milliseconds per word, adding distortion penalty estimation 804 yields a time of 14.7 milliseconds per word, and adding early pruning 806 yields 3.59 milliseconds per word.

The ratio of decoding times for the Pharaoh algorithm 802 compared to that for the best system is 11.8 to 1 to reach the highest Bleu score, and 10.8 to 1 to reach a score of 30.20 Bleu[%]. The ratios of search space for the Pharaoh algorithm compared to that for the best system are even more dramatic. The ratio to reach the highest Bleu score is 18.4, and the ratio to reach a score of 30.20 Bleu[%] is 20.5.

By comparing the algorithms at the same pruning settings and looking at differences in Bleu score and decoding time ratios, an additional insight into where the decoding speed increases are produced. Comparing the original Pharaoh algorithm to the Pharaoh algorithm plus distortion penalty estimation, up to a beam limit of 25, the decoding time ratio for the same pruning settings ranged from 0.88 to 1.19—very little difference. However, the difference in Bleu score when distortion penalty estimation was used ranged from +0.17 Bleu[%] to +0.68 Bleu[%]. Thus the speed-up from resulting from the distortion penalty estimation of the present invention appears to come from being able to obtain a given Bleu score at much tighter pruning settings than were necessary with the baseline algorithm, rather than speeding up decoding at a given combination of pruning settings.

Additionally, comparing distortion penalty estimation to distortion penalty estimation plus early pruning, the difference in Bleu score at the same pruning settings ranged only from −0.024 Bleu[%] to +0.016 Bleu[%]. The decoding time ratio, however, ranged from 1.37 to 6.36 times faster for the decoder with early pruning. Thus early pruning makes almost no difference in Bleu score at a given combination of pruning settings, but it makes decoding up to six times faster.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with beam-search phrasal SMT decoding in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. Beam-search phrasal SMT decoding, and thus the techniques for general sequence translation in accordance with the present invention can be applied with great efficacy in those environments, and in some cases regardless of whether a phrase-based model exists or whether reordering is indicated.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for beam-search phrasal SMT decoding of the invention.

Figure 10:
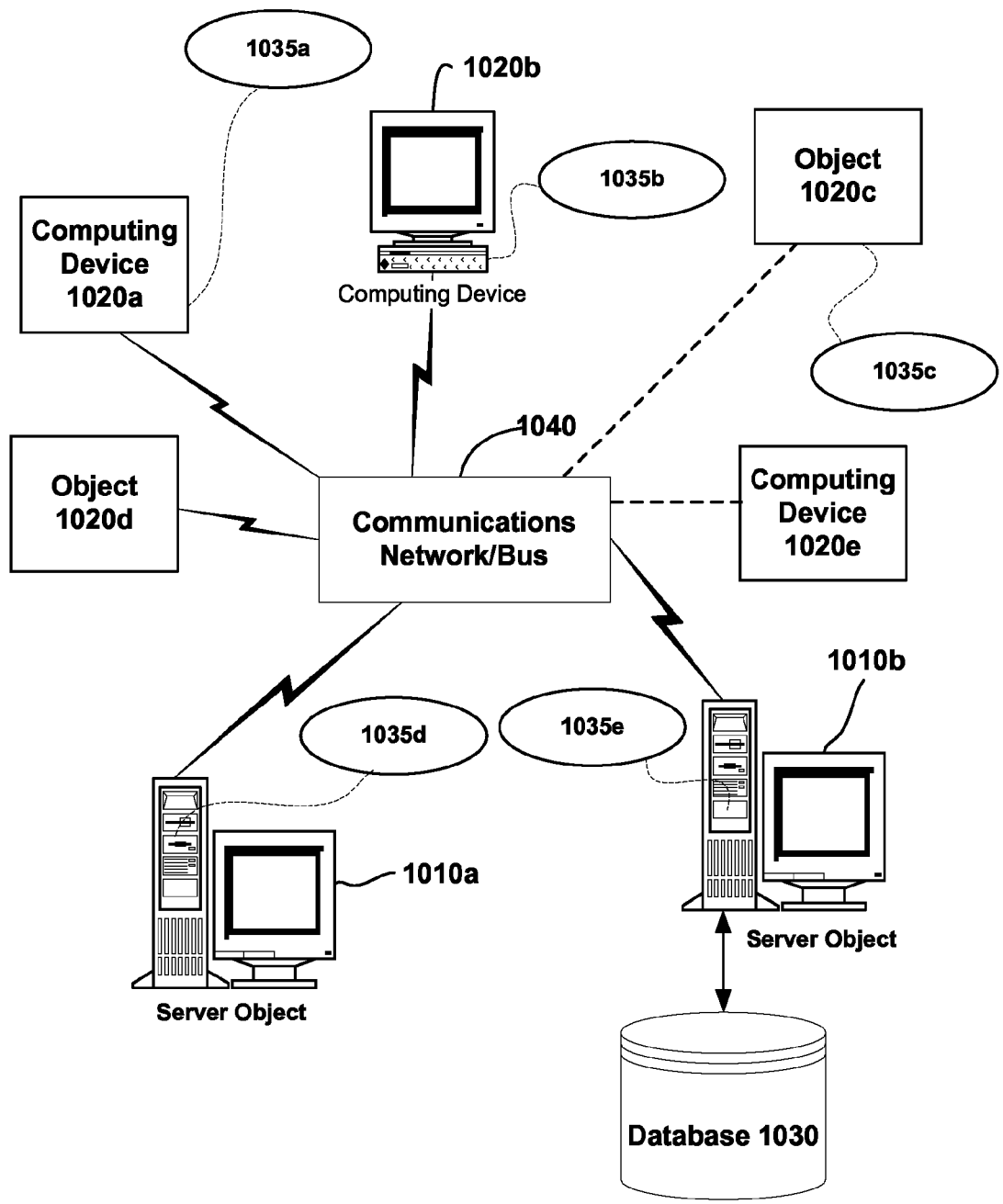
FIG. 10 is a block diagram representing an exemplary non-limiting networked environment in which the present invention may be implemented.

FIG. 10 provides a schematic diagram of an exemplary networked or distributed computing environment. The distributed computing environment comprises computing objects 1010a, 1010b, etc. and computing objects or devices 1020a, 1020b, 1020c, 1020d, 1020e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1040. This network may itself comprise other computing objects and computing devices that provide services to the system of FIG. 10, and may itself represent multiple interconnected networks. In accordance with an aspect of the invention, each object 1010a, 1010b, etc. or 1020a, 1020b, 1020c, 1020d, 1020e, etc. may contain an application that might make use of an API, or other object, software, firmware and/or hardware, suitable for use with the systems and methods for beam-search phrasal SMT decoding in accordance with the invention.

It can also be appreciated that an object, such as 1020c, may be hosted on another computing device 1010a, 1010b, etc. or 1020a, 1020b, 1020c, 1020d, 1020e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications or transmissions made incident to performing beam-search phrasal SMT decoding according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 10, as an example, computers 1020a, 1020b, 1020c, 1020d, 1020e, etc. can be thought of as clients and computers 1010a, 1010b, etc. can be thought of as servers where servers 1010a, 1010b, etc. maintain the data that is then replicated to client computers 1020a, 1020b, 1020c, 1020d, 1020e, etc., although any computer can be considered a client, a server, or both, depending on the circumstances. Any of these computing devices may be processing data or requesting services or tasks that may implicate the methods and systems for beam-search phrasal SMT decoding in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for beam-search phrasal SMT decoding of the present invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 10 illustrates an exemplary networked or distributed environment, with server(s) in communication with client computer(s) via a network/bus, in which the present invention may be employed. In more detail, a number of servers 1010a, 1010b, etc. are interconnected via a communications network/bus 1040, which may be a LAN, WAN, intranet, GSM network, the Internet, etc., with a number of client or remote computing devices 1020a, 1020b, 1020c, 1020d, 1020e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to perform sequence translation using the provided beam-search phrasal SMT decoding techniques.

In a network environment in which the communications network/bus 1040 is the Internet, for example, the servers 1010a, 1010b, etc. can be Web servers with which the clients 1020a, 1020b, 1020c, 1020d, 1020e, etc. communicate via any of a number of known protocols such as HTTP. Servers 1010a, 1010b, etc. may also serve as clients 1020a, 1020b, 1020c, 1020d, 1020e, etc., as may be characteristic of a distributed computing environment.

As mentioned, communications may be wired or wireless, or a combination, where appropriate. Client devices 1020a, 1020b, 1020c, 1020d, 1020e, etc. may or may not communicate via communications network/bus 14, and may have independent communications associated therewith. For example, in the case of a TV or VCR, there may or may not be a networked aspect to the control thereof. Each client computer 1020a, 1020b, 1020c, 1020d, 1020e, etc. and server computer 1010a, 1010b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1010a, 1010b, 1020a, 1020b, 1020c, 1020d, 1020e, etc. may be responsible for the maintenance and updating of a database 1030 or other storage element, such as a database or memory 1030 for storing data processed or saved according to the invention. Thus, the present invention can be utilized in a computer network environment having client computers 1020a, 1020b, 1020c, 1020d, 1020e, etc. that can access and interact with a computer network/bus 1040 and server computers 1010a, 1010b, etc. that may interact with client computers 1020a, 1020b, 1020c, 1020d, 1020e, etc. and other like devices, and databases 1030.

Exemplary Computing Device

Figure 11:
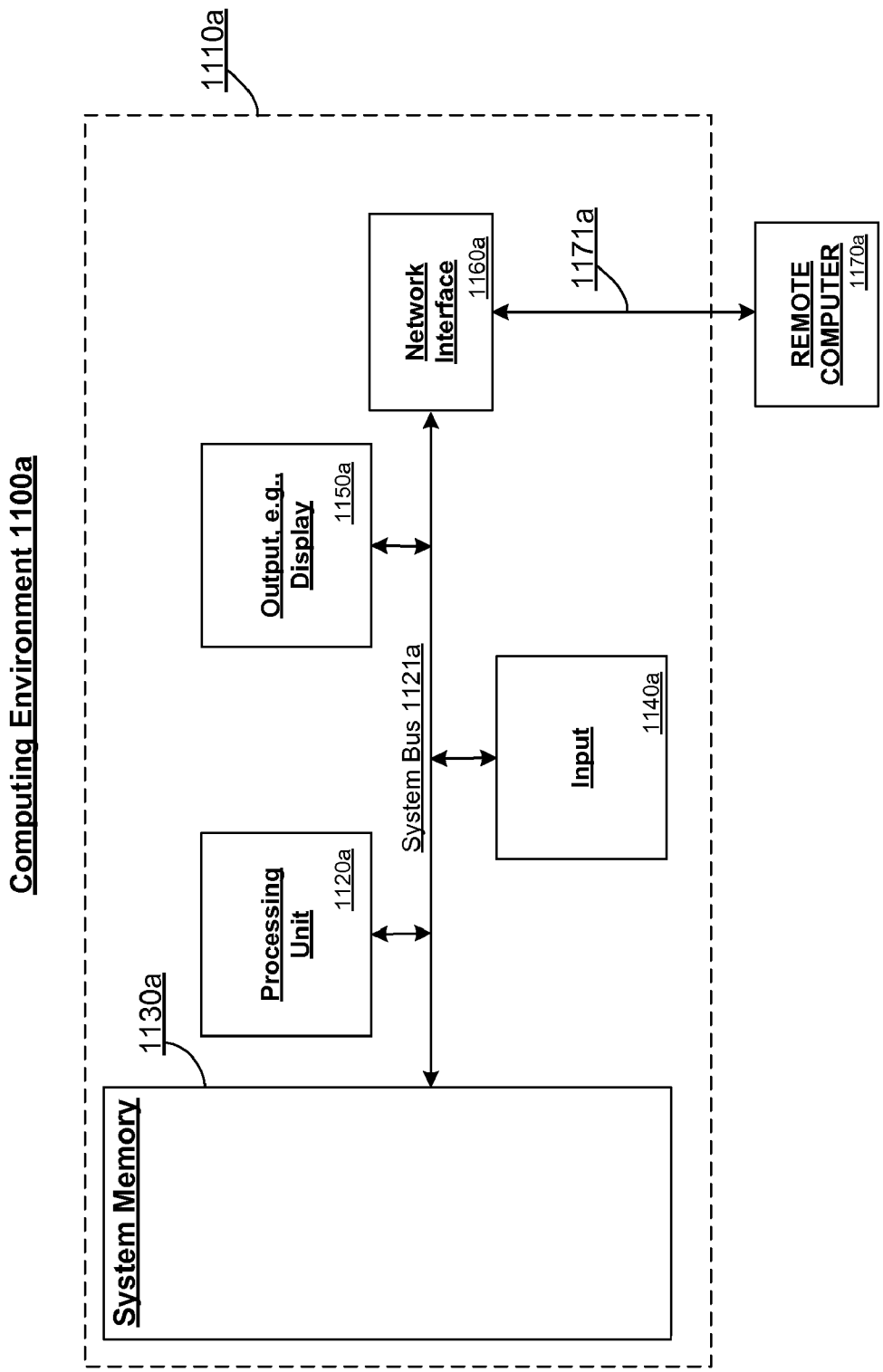
FIG. 11 is a block diagram representing an exemplary non-limiting computing system or operating environment in which the present invention may be implemented.

As mentioned, the invention applies to any device wherein it may be desirable to perform beam-search phrasal SMT decoding. It should be understood, therefore, that handheld, portable and other computing devices and computing objects of all kinds are contemplated for use in connection with the present invention, i.e., anywhere that a device may perform sequence translation or otherwise receive, process or store data. Accordingly, the below general purpose remote computer described below in FIG. 11 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 11 thus illustrates an example of a suitable computing system environment 1100a in which the invention may be implemented, although as made clear above, the computing system environment 1100a is only one example of a suitable computing environment for a media device and is not intended to suggest any limitation as to the scope of use or functionality of the invention. Neither should the computing environment 1100a be interpreted as having any dependency or requirement relating to any one or combination of components illustrated in the exemplary operating environment 1100a.

With reference to FIG. 11, an exemplary remote device for implementing the invention includes a general purpose computing device in the form of a computer 1110a. Components of computer 1110a may include, but are not limited to, a processing unit 1120a, a system memory 1130a, and a system bus 1121a that couples various system components including the system memory to the processing unit 1120a. The system bus 1121a may be any of several types of bus structures including a memory bus or memory controller, a peripheral bus, and a local bus using any of a variety of bus architectures.

Computer 1110a typically includes a variety of computer readable media. Computer readable media can be any available media that can be accessed by computer 1110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110a. Communication media typically embodies computer readable instructions, data structures, program modules or other data in a modulated data signal such as a carrier wave or other transport mechanism and includes any information delivery media.

The system memory 1130a may include computer storage media in the form of volatile and/or nonvolatile memory such as read only memory (ROM) and/or random access memory (RAM). A basic input/output system (BIOS), containing the basic routines that help to transfer information between elements within computer 1110a, such as during start-up, may be stored in memory 1130a. Memory 1130a typically also contains data and/or program modules that are immediately accessible to and/or presently being operated on by processing unit 1120a. By way of example, and not limitation, memory 1130a may also include an operating system, application programs, other program modules, and program data.

The computer 1110a may also include other removable/non-removable, volatile/nonvolatile computer storage media. For example, computer 1110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1121a through a non-removable memory interface such as an interface, and a magnetic disk drive or optical disk drive is typically connected to the system bus 1121a by a removable memory interface, such as an interface.

A user may enter commands and information into the computer 1110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1120a through user input 1140a and associated interface(s) that are coupled to the system bus 1121a, but may be connected by other interface and bus structures, such as a parallel port, game port or a universal serial bus (USB). A graphics subsystem may also be connected to the system bus 1121a. A monitor or other type of display device is also connected to the system bus 1121a via an interface, such as output interface 1150a, which may in turn communicate with video memory. In addition to a monitor, computers may also include other peripheral output devices such as speakers and a printer, which may be connected through output interface 1150a.

The computer 1110a may operate in a networked or distributed environment using logical connections to one or more other remote computers, such as remote computer 1170a, which may in turn have media capabilities different from device 1110a. The remote computer 1170a may be a personal computer, a server, a router, a network PC, a peer device or other common network node, or any other remote media consumption or transmission device, and may include any or all of the elements described above relative to the computer 1110a. The logical connections depicted in FIG. 11 include a network 1171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1110a is connected to the LAN 1171a through a network interface or adapter. When used in a WAN networking environment, the computer 1110a typically includes a communications component, such as a modem, or other means for establishing communications over the WAN, such as the Internet. A communications component, such as a modem, which may be internal or external, may be connected to the system bus 1121 a via the user input interface of input 1140a, or other appropriate mechanism. In a networked environment, program modules depicted relative to the computer 1110a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for sequence translation using beam-search phrasal SMT decoding in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for fast beam-search phrasal SMT decoding of the invention. The invention contemplates the use of the invention from the standpoint of an API (or other software object), as well as from a software or hardware object that performs beam-search phrasal SMT decoding in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to perform beam-search phrasal SMT decoding. For instance, the techniques of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the beam-search phrasal SMT decoding techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the pseudo code and flowcharts of FIG. 2-5. While for purposes of simplicity of explanation, the methodologies are shown and described as a series of blocks or numbered steps, it is to be understood and appreciated that the claimed subject matter is not limited by the order of the blocks or numbered steps, as some blocks or steps may occur in different orders and/or concurrently with other blocks or steps from what is depicted and described herein. Where non-sequential, or branched, flow is illustrated via flowchart or pseudo code, it can be appreciated that various other branches, flow paths, and orders of the blocks, may be implemented which achieve the same or a similar result. Moreover, not all illustrated steps or blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for fast beam-search phrasal SMT decoding. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A decoding method for sequence translation, the method comprising:
   employing a processor that executes instructions retained in a computer memory, the instructions, when executed by the processor, implement at least the following operations:
   receiving sequence data requiring sequence translation;
   front-loading an estimated future distortion penalty in translating a remainder of the sequence of data;
   creating a search space of possible next-phrase translations;
   reducing the search space based in part on the estimated future distortion penalty; and
   selecting a translation candidate for the sequence data.

2. The decoding method of claim 1, wherein the creating comprises using statistical machine translation.

3. The decoding method of claim 2, wherein using statistical machine translation includes using beam-search phrasal statistical machine translation.

4. The decoding method of claim 1, the sequence translation is language translation from a first language to a second language.

5. The decoding method of claim 4, the sequence translation is speech in the first language to speech in the second language.

6. The decoding method of claim 1, the sequence translation is text to speech translation.

7. The decoding method of claim 1, the sequence translation is spelling correction.

8. The decoding method of claim 1, the sequence translation is grammar correction.

9. The decoding method of claim 1, the sequence translation is speech to text.

10. A computer storage media comprising computer executable instructions for performing the method of claim 1.

11. A decoding apparatus comprising means for performing the method of claim 1.

12. The decoding method of claim 1, further comprising estimating a distortion penalty yet to be incurred in translating a remainder of the sequence data.

13. A system for sequence translation, the system comprising:
   a server including at least one processor and at least one computer-readable storage medium coupled to the processor, wherein the computer-readable storage medium includes at least the following components:
   an input component configured to receive sequence data requiring sequence translation;
   a distortion penalty estimation component configured to front load estimated future distortion penalty in translating a remainder of the sequence data;
   a decoding component configured to select a translation candidate for the sequence data and is further configured to create a search space of possible next-phrase translations; and
   an early-pruning component configured to reduce the search space based in part on the estimated future distortion penalty.

14. The system of claim 13, wherein the decoding component is further configured to perform beam-search phrasal statistical machine translation.

15. A decoding apparatus, comprising:
   a memory that retains instructions for receiving sequence data requiring sequence translation; front-loading an estimated future distortion penalty in translating a remainder of the sequence of data; creating a search space of possible next-phrase translations; reducing the search space based in part on the estimated future distortion penalty; and selecting a translation candidate for the sequence data; and
   a processor that is configured to execute the instructions within the memory.

16. The decoding apparatus of claim 15, the memory further retains instruction for statistical machine translation.

17. The decoding apparatus of claim 16, the sequence translation is a beam-search phrasal statistical machine translation.

18. The decoding apparatus of claim 15, the sequence translation is language translation from a first language to a second language.

19. The decoding apparatus of claim 15, the sequence translation is a text to speech translation.

20. The decoding apparatus of claim 15, the sequence translation comprises spelling correct translation.

* * * * *